United States Patent
Kopp

(10) Patent No.: US 12,188,522 B2
(45) Date of Patent: Jan. 7, 2025

(54) WHEEL CARRIER DEVICE AND BEARING DEVICE FOR A VEHICLE, IN PARTICULAR FOR A MOTOR VEHICLE, AND A VEHICLE, IN PARTICULAR MOTOR VEHICLE

(71) Applicant: AUDI AG, Ingolstadt (DE)

(72) Inventor: Andreas Kopp, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/624,164

(22) PCT Filed: Jun. 24, 2020

(86) PCT No.: PCT/EP2020/067578
§ 371 (c)(1),
(2) Date: Dec. 30, 2021

(87) PCT Pub. No.: WO2021/023433
PCT Pub. Date: Feb. 11, 2021

(65) Prior Publication Data
US 2023/0145075 A1 May 11, 2023

(30) Foreign Application Priority Data
Aug. 8, 2019 (DE) .................. 10 2019 211 953.0

(51) Int. Cl.
*B60G 7/00* (2006.01)
*B62D 7/18* (2006.01)
*F16C 35/06* (2006.01)

(52) U.S. Cl.
CPC ............... *F16C 35/06* (2013.01); *B60G 7/00* (2013.01); *B62D 7/18* (2013.01); *B60G 2204/418* (2013.01); *B60G 2206/50* (2013.01); *B60G 2206/7104* (2013.01); *F16C 2326/02* (2013.01)

(58) Field of Classification Search
CPC .. F16C 35/06; F16C 2326/02; F16C 2202/24; F16C 35/042; B62D 7/18; B60G 2204/418; B60G 2206/50
See application file for complete search history.

(56) References Cited

U.S. PATENT DOCUMENTS 2,451,124 A  10/1948  Smith
3,857,556 A  12/1974  Wing

FOREIGN PATENT DOCUMENTS

| CN | 108032696 A | 5/2018 |
| CN | 109923323 A | 6/2019 |
| DE | 7301716 U | 5/1973 |
| DE | 2309550 A1 | 8/1973 |

(Continued)

OTHER PUBLICATIONS

Honjo, Rolling Bearing Unit, Mar. 24, 2011, EPO, JP 2011058523 A, Machine Translation of Description (Year: 2011).*

(Continued)

*Primary Examiner* — Paul N Dickson
*Assistant Examiner* — Matthew D Lee
(74) *Attorney, Agent, or Firm* — Maier & Maier, PLLC

(57) ABSTRACT

A wheel carrier device for a vehicle, with at least one wheel carrier which has at least one bearing point at which at least one wheel bearing is to be mounted for rotatably mounting a wheel hub, wherein the wheel carrier is at least partially surrounded on the outer circumference by at least one thermal insulation element.

19 Claims, 1 Drawing Sheet

(56) References Cited

FOREIGN PATENT DOCUMENTS

| DE | 102009056349 A1 | | 6/2011 | |
|---|---|---|---|---|
| DE | 102012216441 A1 | * | 4/2014 | ............. B60B 27/00 |
| DE | 102013001114 A1 | | 7/2014 | |
| DE | 102013001117 A1 | | 7/2014 | |
| DE | 102015015848 A1 | | 6/2017 | |
| DE | 102018202129 B3 | | 6/2019 | |
| EP | 2436943 A1 | * | 4/2012 | ............. F16C 35/07 |
| JP | 2001246903 A | * | 9/2001 | ............. F16C 27/066 |
| JP | 2011058523 A | * | 3/2011 | |
| WO | 8601160 A1 | | 2/1986 | |
| WO | WO-2010105644 A1 | * | 9/2010 | ............. B22D 19/00 |
| WO | WO-2014166662 A1 | * | 10/2014 | ........... B60B 35/003 |

OTHER PUBLICATIONS

Examination Report issued on Jun. 11, 2021, in corresponding German Application No. 102019211953.0, 12 pages.
International Search Report issued on Oct. 12, 2020, in corresponding International Application No. PCT/EP2020/067578, 15 pages, partial English translation provided.
European Examination Report issued on Mar. 22, 2023, in corresponding European Application No. 20734709.7, 10 pages.
International Preliminary Report on Patentability issued on Feb. 8, 2022, in corresponding International Application No. PCT/EP2020/067578, 10 pages.
Examination Report issued on Jun. 14, 2023, in corresponding European Application No. 20734709.7, 10 pages.
Office Action issued on Oct. 19, 2023, in corresponding Chinese Application No. 202080055503.2, 13 pages.
Office Action issued on Feb. 4, 2024, in corresponding Chinese Application No. 202080055503.2, 8 pages.

* cited by examiner

WHEEL CARRIER DEVICE AND BEARING DEVICE FOR A VEHICLE, IN PARTICULAR FOR A MOTOR VEHICLE, AND A VEHICLE, IN PARTICULAR MOTOR VEHICLE

FIELD

The invention relates to a wheel carrier device for a vehicle. Furthermore, the invention further relates to a bearing device for a vehicle. The invention further relates to a vehicle, in particular a motor vehicle.

BACKGROUND

DE 7301716 U discloses an elastic bearing for elastic support of rail vehicle axles against the car body or the chassis. A vehicle suspension with a spring made of elastomer material is known from DE 2 309 550 A1. In addition, DE 10 2013 001 114 A1 discloses a wheel bearing for rotationally mounting a wheel hub of a vehicle, with an inner bearing shell with at least one inner raceway, with an outer bearing shell with at least one outer raceway, and with rolling elements arranged between the two bearing shells that roll on the raceways. In addition, at least one heating element is arranged within the material of at least one of the two bearing shells in order to heat a storage space between the two bearing shells, the rolling elements being arranged in the storage space.

SUMMARY

The object of the present invention is to obtain a wheel carrier device, a bearing device, and a vehicle such that especially efficient operation of vehicle can be realized.

Said object is achieved according to the invention by means of a wheel carrier device, a bearing device, as well as by a vehicle.

A first aspect of the invention relates to a wheel carrier device for a vehicle preferably formed as a motor vehicle. The wheel carrier device has at least one wheel carrier. The wheel carrier, for example, is a steering knuckle, for example, when the wheel carrier is a component of a steering system, in particular of an axle-pivot steering system. This means that the steering knuckle or the wheel carrier pivots, for example, about a pivot axis, also known as a steering axis, relative to a vehicle structure formed, for example, as a self-supporting body and thereby can be steered. The wheel carrier has at least or precisely one bearing point, at which at least one wheel bearing is to be mounted or can be arranged for rotatable mounting of a wheel hub. The bearing point has, for example, a bearing mount, also known as a mount or recess, in which the wheel bearing can be mounted or is mounted, for example, at least partially, in particular at least predominantly or completely.

In order to then realize especially efficient and thus low-energy, i.e. low-energy-consuming, operation of the vehicle, it is provided according to the invention that the wheel carrier is surrounded on the outer circumference, at least partially, by at least one thermal insulation element which is provided particularly in addition to the wheel carrier and/or formed separately from the wheel carrier. The wheel carrier is hereby formed as a thermally insulated or heat-proof wheel carrier such that, for example, an excess transfer of heat can be prevented from the wheel carrier to an environment of the wheel carrier device.

Studies have shown that the power loss of a wheel bearing for a vehicle has a thermal dependency. Essentially, it is conceivable to use active auxiliary heating measures such as, for example, at least one electric heating element in order to thus actively heat, i.e. to heat or keep warm, the wheel bearing using electrical energy. The power loss of a wheel bearing can thereby be kept low. Such auxiliary heating measures, however, lead to a high number of parts, a high weight, high installation space requirements, and particularly to high costs. In contrast, the invention now makes it possible to curtail the power loss of the wheel bearing which results, for example, during operation of the vehicle and thus to keep heat in and/or on the wheel carrier and particularly in the region of the bearing point or of the wheel bearing without active auxiliary heating measures, in order to thereby realize an advantageous temperature of the wheel carrier device, particularly in the region of the bearing point. Since this is possible without active auxiliary heating measures, an especially advantageous temperature of the wheel bearing can be realized, particularly in the region of the bearing point, without additional energy requirements, and thus without a loss in range and/or additional $CO_2$ emissions.

The invention is particularly based on the knowledge that there is a thermal coupling between the wheel bearing and the wheel carrier in conventional vehicles, it being possible to dissipate the heat from the wheel bearing via said thermal coupling. The heat dissipated from the wheel bearing is discharged to the environment via the wheel carrier, in particular via the surface thereof. This effect is enhanced, for example, when the vehicle is driven through air flowing or streaming past it. The invention now makes it possible to prevent excessive dissipation of heat from the wheel carrier and particularly from the bearing point or the wheel bearing to the environment since, for example, the wheel carrier is encapsulated or thermally insulated or heat-proof on the outer circumference by means of the thermal insulation element.

It has been shown to be especially advantageous when the wheel carrier is at least predominantly surrounded by the thermal insulation element on the outer circumference. It should particularly be understood here that more than half, particularly all, of a surface area or surface on the outer circumference of the wheel carrier is surrounded by the thermal insulation element. An excessive heat loss can thereby be prevented especially well to the extent that especially efficient operation can be shown.

It has further been shown to be advantageous when the thermal insulation element overlaps or covers the bearing point at least partially, particularly at least predominantly or completely. Thus, the thermal insulation element preferably also surrounds at least one or more free surface areas at which the wheel bearing is to be mounted or can be arranged. An excessive transfer of heat from the wheel bearing can hereby be prevented especially well to the extent that especially efficient operation can be shown.

By using the thermal insulation element, the bearing point, for example, or the wheel bearing heats up more quickly as compared to conventional vehicles and particularly during operation of the vehicle in order to reduce the power losses as compared to conventional solutions. In addition, the wheel bearing and the bearing point cool down more slowly during stopped phases as compared to conventional solutions such that, for example during a restart of the vehicle or upon resumption of a trip of the vehicle, the wheel bearing and the bearing point especially advantageously have high temperatures. As a result, the power loss of the wheel bearing can be kept especially low.

In the completely manufactured state of the vehicle, the wheel bearing is used, for example, for rotatably mounting the wheel hub on the wheel carrier. In this case, in the currently manufactured state of the vehicle, at least one wheel of the vehicle is connected to the wheel hub in a rotationally fixed manner, in which the wheel has, for example, a rim and a tire mounted on the rim. Measurements have shown that, with conventional solutions, the combination comprising tire and wheel bearing generates up to 3 g $CO_2$ per kilometer difference in driving resistance at a temperature difference of 10° C. The invention makes it possible, for example, to avoid excessive temperature fluctuations of the wheel bearing over a long period of time, so that its power loss can be kept particularly low.

In order to thermally insulate the bearing point and thus the wheel bearing particularly advantageously, it is provided in a further embodiment of the invention that the thermal insulation element surrounds the bearing point at least partially, in particular at least predominantly or completely, on at least two different sides of the bearing point, the sides being opposite or facing away from each other.

In order to thermally insulate or heat-proof the wheel carrier especially advantageously and consequently to keep the power loss particularly low, a further embodiment of the invention provides that the thermal insulation element has direct contact with an outer circumferential jacket surface of the wheel carrier, i.e. the aforementioned surface thereof, for example. In other words, it is preferably provided that the wheel carrier is sheathed with the thermal insulation element, in particular directly.

The wheel carrier is preferably formed as a single part. Furthermore, it has been shown to be particularly advantageous if the wheel carrier device is free of active heating elements by means of which the wheel carrier or the bearing point can be heated using electrical energy. This ensures especially energy-efficient operation.

In an especially advantageous embodiment of the invention, the wheel carrier is formed from a first, in particular metallic, material, the thermal insulation element being formed from a second material different from the first material, in particular from a plastic. As a result, the wheel carrier can be especially advantageously thermally insulated by means of the thermal insulation element.

In a further embodiment of the invention, the wheel carrier device has the wheel bearing, which is arranged or mounted at the bearing point.

It has been shown to be especially advantageous here if the wheel bearing is at least partially, in particular at least predominantly, surrounded on the outer circumference by at least one further thermal insulation element arranged between the wheel bearing and the wheel carrier. The previous and the following statements regarding the first thermal insulation element can easily be applied to the further thermal insulation element and vice versa. By using the further thermal insulation element, the wheel bearing in particular can be thermally insulated or encapsulated from the environment and in particular from the wheel carrier, so that particularly efficient operation can be shown. The thermal insulation elements are formed, for example, separately from one another, or the thermal insulation elements are formed with one another as a single part.

The further thermal insulation element is formed, for example, from a stiff, but poorly thermally conductive material. For example, the further thermal insulation element forms a wheel bearing seat on which the wheel bearing is supported, in particular directly, and thus is mounted. As a result, excessive heat transfer can be avoided from the wheel bearing to the wheel carrier, such that the power loss of the wheel bearing can be kept within an especially low scope.

A second aspect of the invention relates to a bearing device for a vehicle, in particular for a motor vehicle, with at least one wheel bearing for rotatably mounting a wheel hub on a wheel carrier of the vehicle. In order to realize especially energy-efficient operation of the vehicle, the second aspect of the invention provides that the wheel bearing is at least partially surrounded on the outer circumference by at least one thermal insulation element. Advantages and advantageous embodiments of the first aspect of the invention should be considered advantages and advantageous embodiments of the second aspect of the invention and vice versa. In particular, the previous and following statements regarding the wheel carrier and the thermal insulation element of the first aspect of the invention can be applied accordingly to the wheel bearing and the thermal insulation element according to the second aspect of the invention and vice versa.

The invention may also include an arrangement of a bearing device, in particular according to the second aspect of the invention, on a wheel carrier. In the arrangement, the bearing device is held on the wheel carrier, the bearing device comprising at least one wheel bearing for rotatably mounting a wheel hub on the wheel carrier. In the arrangement, for example, the thermal insulation element is arranged between the wheel carrier and the wheel bearing, the thermal insulation element at least partially, in particular at least predominantly, surrounding the wheel bearing on the outer circumference. Advantages and advantageous embodiments of the first and the second aspect of the invention should be considered advantages and advantageous embodiments of the arrangement according to the invention and vice versa.

A third aspect of the invention relates to a vehicle with at least one wheel carrier device according to the first aspect of the invention and/or with at least one bearing device according to the second aspect of the invention. Advantages and advantageous embodiments of the first and the second aspect of the invention and of the arrangement according to the invention should be considered advantages and advantageous embodiments of the third aspect of the invention and vice versa.

The invention also includes refinements of the vehicle according to the invention, which have features as they have already been described in association with the refinements of the wheel carrier device according to the invention or of the bearing device according to the invention. For this reason, the corresponding refinements of the vehicle according to the invention are not described again here.

The vehicle according to the invention is designed preferably as a motor vehicle and preferably as an automobile, particularly as a passenger car or commercial vehicle, or as a passenger bus or motorcycle. In particular, the vehicle is preferably a vehicle not bound to rails, the vehicle preferably being a road vehicle.

The invention also comprises the combinations of the features of the described embodiments.

BRIEF DESCRIPTION OF THE FIGURES

Exemplary embodiments of the invention are described in the following. The following is shown.

DETAILED DESCRIPTION

Figure 1:
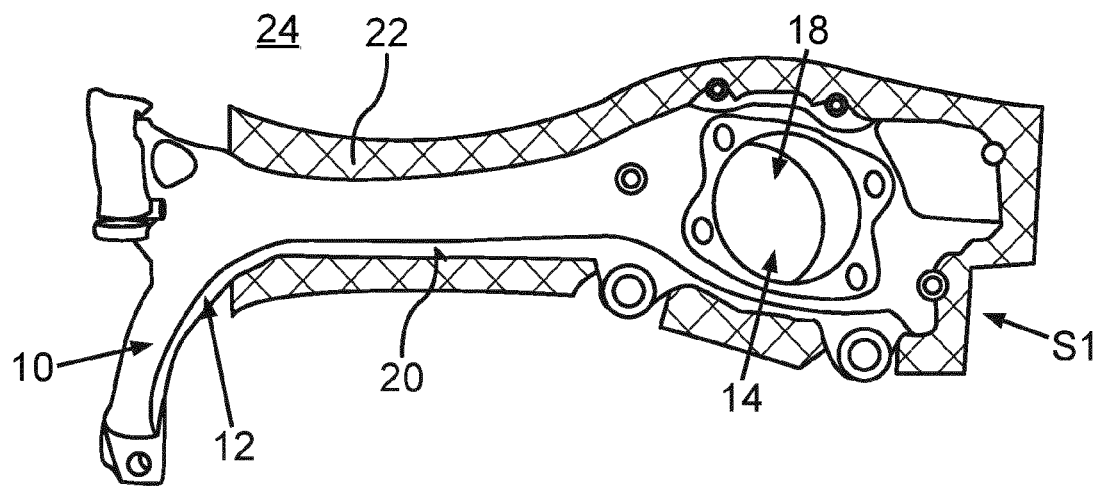
FIG. 1 a schematic perspective view of a wheel carrier device according to the invention for a vehicle.

The exemplary embodiments explained in the following refer to preferred embodiments of the invention. With the exemplary embodiments, the described components of the embodiments represent individual features to be considered independently of one another, which also further embody the invention independently of one another. Thus, the disclosure should also comprise combinations of the features of the embodiments other than those shown. Furthermore, the described embodiments can also be supplemented through further described features of the invention.

The same reference numerals refer to equivalent features and functions in the figures.

FIG. 1 shows a schematic perspective view of a wheel carrier device 10 for a vehicle, which is preferably a motor vehicle. The wheel carrier device 10 has at least or precisely one wheel carrier 12. In its completely manufactured state, the vehicle has the wheel carrier device 10 and thus the wheel carrier 12. In its completely manufactured state, the vehicle can particularly have a steering system designed, for example, as an axle-pivot steering system, in which the steering system may comprise the wheel carrier device 10 and thus the wheel carrier 12. In this case, the wheel carrier 12, for example, is a steering knuckle, which pivots about a pivot axis, also known as a steering axis, relative to a vehicle structure formed, for example, as a self-supporting body and thus can be steered.

Figure 2:
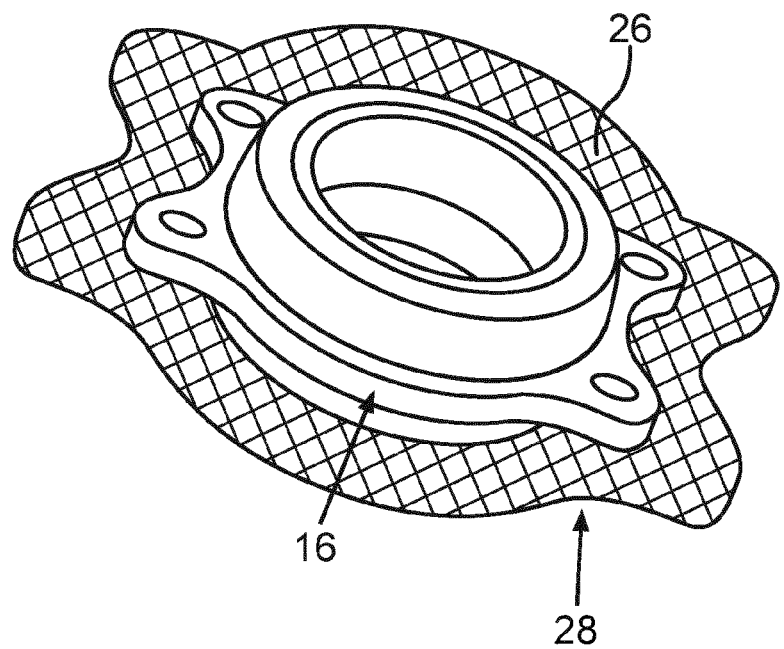
FIG. 2 a schematic perspective view of a bearing device according to the invention for a vehicle.

The wheel carrier 12 has at least or precisely one bearing point 14, at which at least or precisely one wheel bearing 16, for example as shown in FIG. 2, is to be mounted or is mounted for rotatable mounting of a wheel hub. This means that, in the completely manufactured state of the vehicle, the previously mentioned wheel hub is rotatably mounted at the bearing point 14 and thus rotatably mounted on the wheel carrier 12, via the wheel bearing 16, such that the wheel hub can rotate about an axis of rotation relative to the wheel carrier 12. The wheel bearing 16 in this case is formed, for example, as a roller bearing, which has an outer ring, an inner ring, and a rolling element. The outer ring and the inner ring are also characterized as bearing rings, which have respective raceways. The rolling elements in this case are arranged between the bearing rings and, particularly in this case, between the raceways and roll on the raceways, between the bearing rings, during a relative rotation. In this case, in the completely manufactured state of the vehicle, a wheel, also known as a vehicle wheel, is connected to the wheel hub in a rotationally fixed manner such that, for example, the wheel rotates together with the wheel hub about the axis of rotation relative to the wheel carrier 12 when the vehicle is driven. The wheel is a ground-contact element, by means of which the vehicle can be supported or is supported downwardly on the ground in the vertical direction of the vehicle. If the vehicle is moved along the ground while the vehicle is supported downwardly on the ground in the vertical direction of the vehicle via the wheel, the wheel rolls along the ground and the wheel rotates about the axis of rotation relative to the wheel carrier 12.

The bearing point 14 in this case has a bearing mount 18, also known as a recess or mount, in which the wheel bearing 16 is accommodated at least partially, particularly at least predominantly or completely, in particular in relation to the axial direction of the wheel bearing 16. The axial direction of the wheel bearing 16 in this case coincides with the previously mentioned axis of rotation. If the wheel carrier 12 can be pivoted, for example, about the steering axis, then the wheel can also be pivoted about the steering axis relative to the body. In other words, the wheel can be steered in order to thereby implement, for example, a lane change, changes in direction, and curve-driving of the vehicle.

In order to realize especially energy-efficient operation of the vehicle, the wheel carrier 12, particularly the outer circumferential jacket surface 20 thereof, is at least partially, particularly at least predominantly, surrounded by at least one thermal insulation element 22. In the exemplary embodiment shown in FIG. 1, the thermal insulation element 22 is provided in addition to the wheel carrier 12 and formed separately from the wheel carrier 12. In this case, the wheel carrier 12 is surrounded on the outer circumference, at least predominately, by the thermal insulation element 22 such that more than half of the outer circumferential jacket surface 20 is surrounded by the thermal insulation element 22. The outer circumferential jacket surface 20 is also known as the surface area or surface of the wheel carrier 12.

In order to avoid excessive or excessively quick dissipation of heat from the wheel carrier 12 and particularly from the bearing point 14 or from the wheel bearing 16 to an environment 24 of the wheel carrier device 10 and, as a result, to realize especially energy-efficient operation of the vehicle, the thermal insulation element 22 overlaps the bearing point 14 at least partially, particularly at least predominantly or completely. In particular, it is preferably provided that the thermal insulation element 22 surrounds the bearing point 14 at least partially, in particular at least predominantly or completely, on at least two different sides thereof, the sides being opposite or facing away from each other.

One of the sides is designated as 51 in FIG. 1. FIG. 1 does not show the other side since it is, for example, a backside of the wheel carrier 12 and consequently is facing away from the viewer's perspective in FIG. 1.

In order to avoid an excessive transfer of heat to the environment 24, the thermal insulation element 22 has direct contact with the outer circumferential jacket surface 20. Thus, the wheel carrier 12 is sheathed with the thermal insulation element 22. In addition, FIG. 1 shows especially well that the wheel carrier device 10 is completely free of heating elements, by means of which the wheel carrier 12 or the bearing point 14 can be actively heated using electrical energy. In addition, it is preferably provided that the wheel carrier 12 is formed from a first, particularly metallic, material, while the thermal insulation element 22 is preferably formed from a second material, which is different from the first material, particularly from a plastic.

FIG. 2 shows that the wheel bearing 16 is surrounded on the outer circumference at least partially by at least one further thermal insulation element 26. Preferably, the thermal insulation element 26 is formed from a third material, which is different from the first material and/or from the second material, in which the third material and the second material can be the same. In particular, the thermal insulation element 26 can be formed from a plastic.

In the completely manufactured state of the vehicle or in an arrangement of the wheel bearing 16 on the wheel carrier 12, the thermal insulation element 26 is arranged at least partially, particularly at least predominantly or completely, between wheel bearing 16, which is formed separately from wheel bearing 12, and wheel bearing 12. Thus, wheel bearing 16, for example, is thermally encapsulated with respect to wheel carrier 12 and particularly with respect to the environment 24 by means of the thermal insulation element 26. In this case, the thermal insulation element 22 can optionally be omitted.

By using thermal insulation element 22 and/or 26, the wheel bearing 16, for example, can heat up especially quickly when the vehicle is driven and particularly due to a power loss such that especially energy-efficient operation can consequently be shown. In addition, excessively quick cooling of the wheel bearing 16 can be avoided, for example, during a stopped phase following the drive such that the wheel bearing 16 has an especially advantageously high temperature when the trip is resumed. As a whole, the power loss of the wheel bearing 16 can be kept low such that the vehicle can be operated, particularly driven, especially energy-efficiently. Furthermore, overall it is clear that thermal insulation element 22 or 26 represents thermal insulation or encapsulation of wheel carrier 12 with respect to the environment 24 or wheel bearing 16 with respect to wheel carrier 12, and particularly with respect to the environment 24. Excessive heat loss of the wheel bearing 16 can thereby be avoided. In addition, the wheel bearing 16 can be heated especially quickly or kept warm without additional, active heating measures being required for this. As a result, the energy consumption, the number of parts, the costs, the weight, and the installation space requirements can be kept especially low.

Preferably, the thermal insulation element 26 is connected to the wheel bearing 16, particularly also independently of the wheel carrier 12. In addition, FIG. 2 shows that at least the thermal insulation element 26 and the wheel bearing 16 form a bearing device 28, which comprises the wheel bearing 16 and the thermal insulation element 26 at least partially surrounding the wheel bearing 16 on the outer circumference.

The invention claimed is:

1. A wheel carrier device for a vehicle, comprising:
at least one wheel carrier which has at least one bearing point at which at least one wheel bearing is to be mounted for rotatably mounting a wheel hub,
wherein the wheel carrier is at least partially surrounded on the outer circumference by at least one thermal insulation element.

2. The wheel carrier device according to claim 1, wherein the wheel carrier is mostly surrounded on the outer circumference by the thermal insulation element.

3. The wheel carrier device according to claim 1, wherein the thermal insulation element overlaps the bearing point at least partially.

4. The wheel carrier device according to claim 1, wherein the thermal insulation element surrounds the bearing point at least partially on at least three different sides of the bearing point.

5. The wheel carrier device according to claim 1, wherein the thermal insulation element has direct contact with an outer circumferential jacket surface of the wheel carrier.

6. The wheel carrier device according to claim 1, wherein the wheel carrier is formed from a first material, and the thermal insulation element is formed from a second material, which is different from the first material.

7. The wheel carrier device according to claim 1, wherein the wheel carrier device has the wheel bearing which is arranged at the bearing point.

8. The wheel carrier device according to claim 7, wherein the wheel bearing is at least partially surrounded on the outer circumference by at least one further thermal insulation element arranged between the wheel bearing and the wheel carrier.

9. The wheel carrier device according to claim 2, wherein the thermal insulation element overlaps the bearing point at least partially.

10. The wheel carrier device according to claim 2, wherein the thermal insulation element surrounds the bearing point at least partially on at least three different sides of the bearing point.

11. The wheel carrier device according to claim 3, wherein the thermal insulation element surrounds the bearing point at least partially on at least three different sides of the bearing point.

12. The wheel carrier device according to claim 2, wherein the thermal insulation element has direct contact with an outer circumferential jacket surface of the wheel carrier.

13. The wheel carrier device according to claim 3, wherein the thermal insulation element has direct contact with an outer circumferential jacket surface of the wheel carrier.

14. The wheel carrier device according to claim 4, wherein the thermal insulation element has direct contact with an outer circumferential jacket surface of the wheel carrier.

15. The wheel carrier device according to claim 2, wherein the wheel carrier is formed from a first material, and the thermal insulation element is formed from a second material, which is different from the first material.

16. The wheel carrier device according to claim 3, wherein the wheel carrier is formed from a first material, and the thermal insulation element is formed from a second material, which is different from the first material.

17. The wheel carrier device according to claim 4, wherein the wheel carrier is formed from a first material, and the thermal insulation element is formed from a second material, which is different from the first material.

18. The wheel carrier device according to claim 5, wherein the wheel carrier is formed from a first material, and the thermal insulation element is formed from a second material, which is different from the first material.

19. A vehicle, comprising:
at least one wheel carrier device having at least one wheel carrier which has at least one bearing point at which at least one wheel bearing is to be mounted for rotatably mounting a wheel hub, wherein the wheel carrier is at least partially surrounded on the outer circumference by at least one thermal insulation element; and
at least one bearing device with at least one wheel bearing for rotatably mounting a wheel hub on a wheel carrier of the vehicle, wherein the wheel bearing is at least partially surrounded on the outer circumference by at least one thermal insulation element.

* * * * *